INVENTOR
SIDNEY J. SCHWARTZ
BY Louis A. Kline
Glenn W. Bowes
HIS ATTORNEYS

Aug. 5, 1969 S. J. SCHWARTZ 3,460,107

TRANSVERSE INHIBIT MEMORY SYSTEM HAVING A FLUX INTEGRATION FORM OF SIGNAL DETECTION

Filed Nov. 10, 1966 3 Sheets-Sheet 2

INVENTOR
SIDNEY J. SCHWARTZ
BY Louis A Kline
Glenn W. Bowen
HIS ATTORNEYS

Aug. 5, 1969 S. J. SCHWARTZ 3,460,107

TRANSVERSE INHIBIT MEMORY SYSTEM HAVING A FLUX INTEGRATION FORM OF SIGNAL DETECTION

Filed Nov. 10, 1966 3 Sheets-Sheet 3

INVENTOR
SIDNEY J. SCHWARTZ

BY Louis A Kline
Benny W. Bones

HIS ATTORNEYS

United States Patent Office 3,460,107
Patented Aug. 5, 1969

3,460,107

TRANSVERSE INHIBIT MEMORY SYSTEM HAVING A FLUX INTEGRATION FORM OF SIGNAL DETECTION

Sidney J. Schwartz, Beavercreek Township, Ohio, assignor to The National Cash Register Company, Dayton, Ohio, a corporation of Maryland Filed Nov. 10, 1966, Ser. No. 593,573
Int. Cl. G11b *5/00*
U.S. Cl. 340—174 6 Claims

ABSTRACT OF THE DISCLOSURE

A magnetic memory system which has magnetic memory elements with two stable states of remanent magnetism, means to produce a read magnetic field, means to produce an inhibit magnetic field, a sensing means, and an integrating means which integrates the sensed signal to produce an output signal which is representative of the initial memory state of the magnetic memory element when the means to produce the inhibit magnetic field has not been energized is disclosed. Thin magnetic film memory elements are employed in the described embodiment.

This invention relates to magnetic memory devices. The present invention employs an inhibit scheme that depends on a flux integration signal detection technique which keeps inhibited memory elements from contributing to the sense amplifier output when readout from only a selected memory element is desired. The selected memory element may be read either destructively or nondestructively. In this manner, the number of readout and drive circuits required by a magnetic memory may be reduced, resulting in significant cost reduction in the manufacture of memory systems.

An embodiment of the invention will not be described by way of example with reference to the accompanying drawings, in which.

Figure 1:
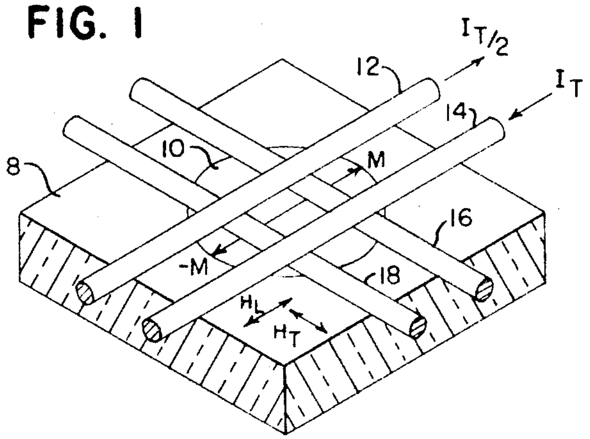
FIG. 1 is a diagram of a single memory element and associated conductors.

FIG. 1 shows a thin magnetic memory film 10, which is shown as a planar film (but films of other geometry are applicable) and which is anisotropic having a preferred or easy direction of magnetization parallel to the vectors M and —M, and a hard direction of magnetization transverse to the vectors M and —M. The memory film 10 is deposited or secured by other means on the substrate 8, which may be polyethylene terephthalate, which is sold under the trademark Mylar or other suitable material. The memory film 10 has a thickness in the range of 100 to 12,000 angstroms. The memory film 10 may be formed by evaporation, by electro-deposition, or by a number of other methods that are well known in the art. The memory 10 has associated with it four electrical conductors 12, 14, 16, and 18. The conductor 14 is a word drive line or X-select line for the memory film 10. The digit drive or Y-select conductor 16, which is perpendicular to the conductor 14, may be pulsed with a current to supply a longitudinal magnetic field $H_L$ in a direction parallel to the easy direction of magnetization of the memory film 10. A current pulse through the conductor 16, in a predetermined direction, coincidental with a current pulse through the conductor 14, in either direction, results in the magnetization vector M of the memory film 10 being oriented in a direction parallel to the easy axis of magnetization of the memory film 10 upon termination of the current through the conductor 14. A current pulse through the conductor 16, in a direction opposite to the predetermined direction, coincidental with the write current pulse through the conductor 14 results in a displacement of the magnetization vector M 180 degrees to the opposite binary state of the memory film 10 along the easy axis of magnetization. A coincidence of current through the conductors 14 and 16 is, therefore, necessary to determine the state of the memory film 10 during the write cycle. However, the direction of the current flow through the conductor 14 during the write cycle is immaterial, as it is the direction of current flow through the conductor 16 during the write cycle that determines the storage state of the memory film 10. The direction of current through the conductor 14 does determine the polarity of the readout signal during the read cycle, but the current through the conductor 14 in the preferred embodiment is always in the same predetermined direction during a readout cycle, since it must provide a field that is displaced 180 degrees from the field that results from current in the conductor 12, which serves as an inhibit conductor.

Figure 3:
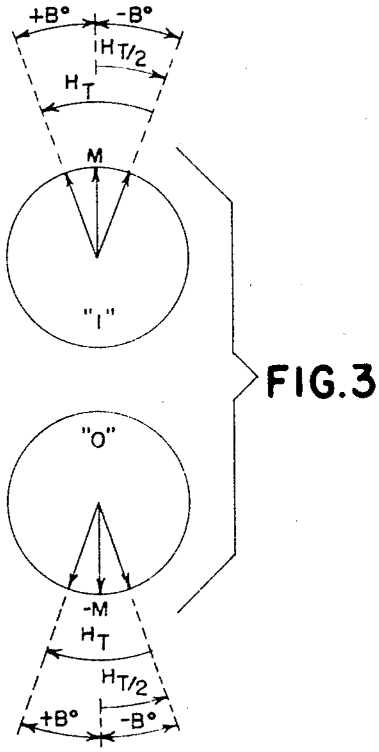
FIG. 3 is a vector diagram representing the rotation of magnetization of an inhibited memory element.

Readout from the memory film 10 is obtained by passing a current pulse through the conductor 14 to establish a transverse magnetic read field $H_T$. If a "1" has been stored in the magnetic film 10, one polarity of output signal is induced in the conductor 18, which serves as a sense conductor during the time when the field $H_T$ is changing, by the rotation of the magnetization vector M through the angle A from the "1" state of the magnetization vector M, shown in FIG. 2. By the use of conventional strobing techniques, it is insured that the signal induced in the conductor 18 during the subsequent relaxation of the magnetization vector M to its initial state is not utilized. If a "0" has been stored in the memory film 10, rotation of the magnetization vector M through the angle A from the "0" state of the magnetization vector M, shown in FIG. 2, results in an opposite polarity signal being induced into the sense conductor 18 during the period when $H_T$ is changing. The digit and sense conductors 16 and 18 may be combined into a single multi-purpose conductor if desired. When it is desired to inhibit the memory film 10, a current pulse of approximately one half the magnitude of the current pulse through the conductor 14 is supplied through the conductor 12 just prior to the current pulse which is supplied to the conductor 14, to create a transverse inhibit magnetic field which has approximately one half the magnetic field strength of the magnetic read field and which is in a direction opposite to the direction of the magnetic read field. The inhibit current through the conductor 12 prebiases the magnetization vector M to an angle —B in a direction opposite to the direction of rotation of the magnetization vector M of the memory film 10 that is caused by the magnetic read field $H_T$. When the transverse read field is applied after the inhibit current has rotated the magnetization vector M to the angle —B, the magnetization vector M rotates in a direction opposite to the direcion caused by $H_T$ to an angle +B, as shown in FIG. 3.

The voltage induced into the sense line 18 as a result of rotation of the magnetization vector M of the memory film 10 is applied to an integrating circuit which is coupled to the sense line 18.

Integrating circuits perform mathematical integration of an applied input voltage, and they produce an output voltage which is proportional to the integral of the input voltage waveform. An integrating circuit may simply be a resistor that is connected at one end to a sense line and is connected at the other end to one plate of a capacitor that has its other plate connected to a reference potential; or it may be a differential amplifier type of integrating circuit.

Figure 2:
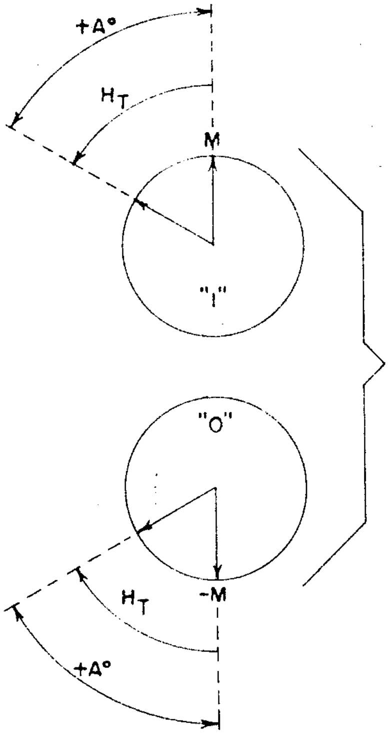
FIG. 2 is a vector diagram representing the rotation of magnetization of an uninhibited memory element.

The output signal $V_{out}$, provided by the integrating circuit is, therefore, related to the magnitude of the magnetization vector M and to the angle A of FIG. 2, through which it rotates relative to the easy axis of magnetization of the memory film 10 when no inhibit magnetic field is provided to the memory film 10. Thus, the integrating circuit will produce output voltages which increase as the angle of rotation of the magnetization vector M approaches ninety degrees. Assuming that no inhibit current is supplied, the polarity of the output voltage indicates whether a "1" or a "0" was initially stored in the memory film 10.

If an inhibit current is supplied through the inhibit conductor 12 in a direction to create an inhibit magnetic field which opposes the transverse read field produced by the current through the X-select conductor 14, the output of the integrating amplifier acquires a substantially zero value when the magnetization vector swings from the angle −B to the angle +B (see FIG. 3).

Figure 4:
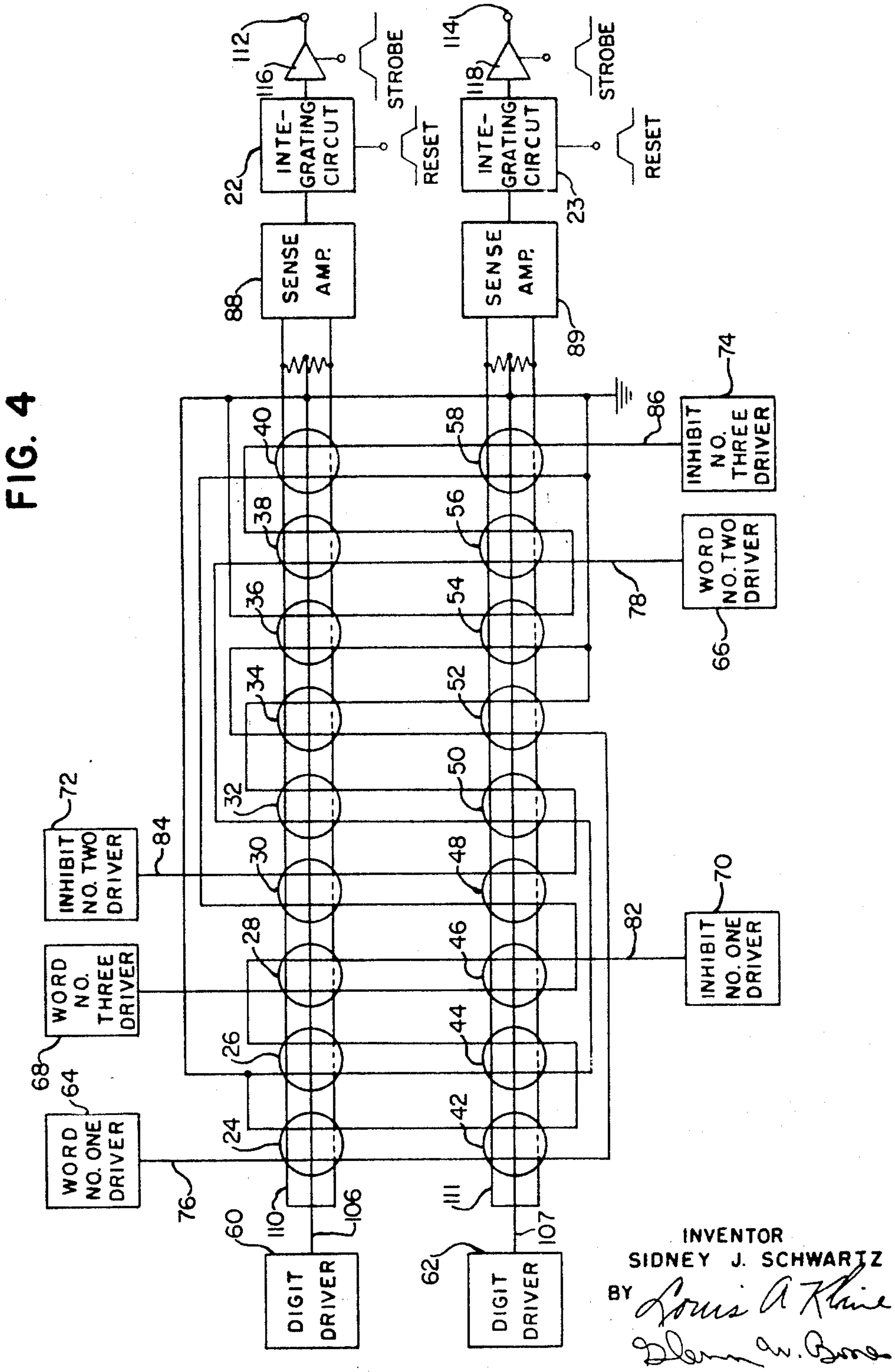
FIG. 4 is a block diagram of a memory system employing a transverse inhibit line and sense amplifiers which share a number of memory elements.

FIG. 4 represents a block diagram of a three word-eighteen bit memory system. Nine memory films 24, 26, 28, 30, 32, 34, 36, 38, and 40 are coupled to a digit drive line 106, which is driven by the digit driver 60, and to a balanced sense line 110. Nine other memory films 42, 44, 46, 48, 50, 52, 54, 56, and 58 are coupled to a digit drive line 107, which is driven by the digit driver 62 and to a balanced sense line 110. The word number one driver 64 drives the conductor 76, which is coupled to the memory films 24, 42, 52, 34, 36, and 54. These films correspond to the digits 1 to 6, respectively, of memory word number one. The word number two driver 66 drives the conductor 78, which is coupled to the memory films 56, 38, 32, 50, 44, and 26. These films represent the digits 1 to 6, respectively, of memory word number two. The word number three driver drives the conductor 80, which is coupled to the memory films 28, 46, 48, 30, 40, and 58. These films represent the digits 1 to 6, respectively, of memory word number three. The sense line 110 is coupled to a sense amplifier 88 and to an associated intergrating circuit 22, while the sense line 111 is coupled to a sense amplifier 89 and to an associated integrating circuit 23.

The memory system shown in FIG. 4 also includes three inhibit drivers 70, 72, and 74. The driver 70 drives an inhibit drive line 82, which is coupled to the memory films 24, 26, 28, 42, 44, and 46; the driver 72 drives an inhibit drive line 84, which is coupled to the memory films 30, 32, 34, 48, 50, and 52; and the driver 74 drives an inhibit drive line 86, which is coupled to the memory films 36, 38, 40, 54, 56, and 58.

Writing a "1" into a particular memory film requires coincident current pulses on the associated digit and word drive lines. For example, application of a current pulse from the word number one driver 64 on the word number one drive line 76 with a concurrent current pulse of a predetermined sense being applied to the digit line 106 by the bi-polar digit driver 60 will change the state of magnetization of the memory film 24, which represents bit 1 of word 1, to a "1" state The memory films corresponding to the bits of the selected word which are not to be written are maintained in their previous state by application of inhibit magnetic fields to these films. Thus all films common to a given word line and digit line are inhibited with the exception of the film in which a digit is to be written. It is possible that more than one bit corresponding to a digit line may be written at one time by not inhibiting the memory films associated with those bit positions. This condition would exist when special logical operations are to be performed in the memory.

Considering, for example, the memory film 24, application of a transverse voltage pulse by the word number one driver 64 to the drive line 76 during the read cycle results in the rotation of the magnetization vector of the memory film 24, and providing that an inhibit magnetic field is not applied to the film 24, a voltage indicating that a "1" or a "0" is stored in the memory film 24 will be induced into the balanced sense line 110, which travels over the associated film in one direction and under it in the other direction. This induced voltage is coupled into the sense amplifier 88 and is passed to the integrating circuit 22, where it is integrated to produce an indication of the state of the memory film 24. If the inhibit driver 70 is applying a current pulse to the inhibit line 82 during the read cycle, the output of the integrating circuit 22 acquires a substantially zero value regardless of the initial state of the memory film 24. The memory film 24 shares the sense amplifier 88 with a number of other memory films 26, 28, 30, 32, 34, 36, 38, and 40, since one word driver and a number of inhibit drivers may be selected concurrently to insure that only one memory film can induce a voltage into the sense line 110 during the read cycle.

Figure 5:
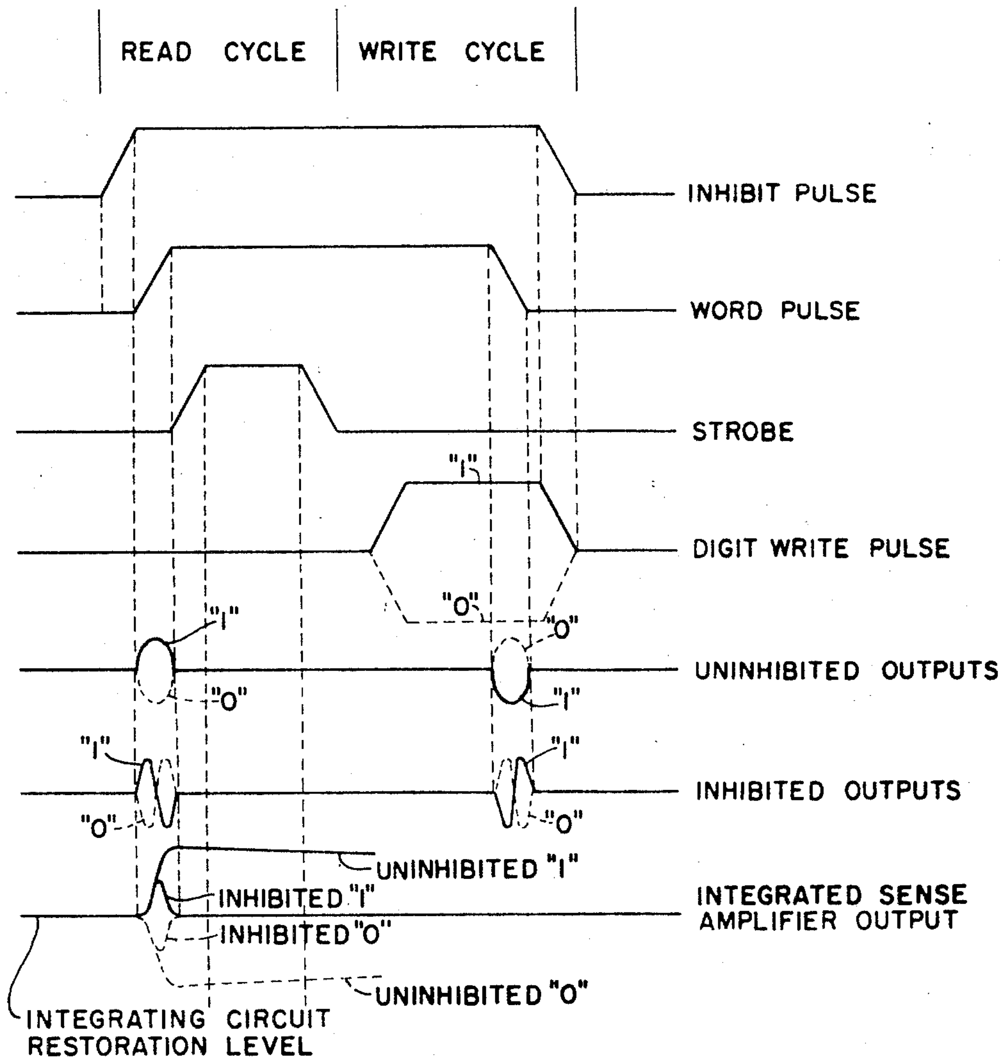
FIG. 5 is a timing chart of the write and read waveforms associated with FIG. 4.

FIG. 5 is a timing chart for the memory system of FIG. 4.

The memory system of FIG. 4 is particularly useful when it is desired to compare the number of "1's" and "0's" that are stored in selected memory films. The integrating circuit 22 will produce an integrated output signal that is of one polarity when the number of "1's" exceeds the number of "0's" in the memory bits that are read out. If the number of "0's" exceeds the number of "1's" in the memory bits that are read out, the integrated output signal is of the opposite polarity. When the number of "1's" equals the number of "0's" in the memory bits that are read out, the integrated output signal is zero.

Permalloy memory elements with a local easy axis dispersion of ±6 degrees have been found to be satisfactory for the present invention if the easy axis is positioned in a direction substantially normal to the sense line.

Magnetic memory elements, as used in the preferred embodiment of this invention, may be planar magnetic films, wires plated with magnetic material having a circumferential or an axial easy direction of magnetization, or any other device that is constructed of a magnetic material that has a magnetization vector that is capable of returning to the initial magnetization direction after having been rotated by the transverse-inhibit field and is also capable of being returned by anistropy forces to the easy axis of magnetization at the cessation of the transverse-inhibit field. The storage element may be read non-destructively due to the presence of the transverse word field in the absence of a transverse-inhibit field. This read-out of the selected bit, however, could also be a destructive read-out if so desired.

What is claimed is:

1. A magnetic memory device comprising:

(a) a magnetic storage element having a remanent magnetism which has two stable memory states, and (b) read means constructed to produce a read displacement of the remanent magnetism of the magnetic storage element from an initial stable memory state during a read cycle of operation of the memory device, and (c) inhibit means constructed to be selectively activated during a read cycle in such a manner as to produce an inhibit displacement of the remanent magnetism of the magnetic storage element from the initial memory state in a different sense from the read displacement, and (d) sensing means coupled to the storage element which is constructed to sense during a read cycle a sense signal which is produced in response to the read displacement and the inhibit displacement, if any, of the remanent magnetism of the magnetic storage element, and (e) integrating means coupled to the sensing means that is constructed to integrate the sense signal, the arrangement being such that the integrated sense signal represents the initial memory state whenever the inhibit means is not activated during a read cycle, and such that the integrated sense signal acquires a substantially zero value whenever the inhibit means is activated during a read cycle.

2. A magnetic memory device as in claim 1 in which, during a read cycle, the read displacement of the remanent magnetism of the magnetic storage element occurs subsequent to any inhibit displacement of the remanent magnetism of the magnetic storage element, the read displacement being in the opposite sense with respect to, and being substantially equal to twice the magnitude of, any inhibit displacement.

3. A magnetic memory device as in claim 2 wherein the magnetic storage element is an anisotropic magnetic thin film element having an easy axis of magnetization, the remanent magnetism of the storage element being set parallel to the easy axis when the storage element is in either of its stable states, and the read and inhibit displacements of the remanent magnetism of the magnetic storage elements are rotational displacements.

4. A magnetic memory system comprising:

(a) a plurality of magnetic storage elements each of which has a remanent magnetism which has two stable memory states, and (b) read means constructed to produce read displacements of the remanent magnetism of selected storage elements from their respective initial memory states during a read cycle of operation of the memory system, the read means including a plurality of word drive lines which are each coupled to a different set of the storage elements, the elements of each of such sets storing digits of a respective word, and (c) inhibit means constructed to produce inhibit displacements of the remanent magnetism of selected storage elements from their respective initial memory states during the read cycle, the inhibit displacements being in a different sense from their respective read displacements, the inhibit means including a plurality of inhibit drive lines which are each coupled to adifferent set of storage elements, each of the storage elements of the last-mentioned set respectively storing digits of different words, the arrangement being such that each storage element is coupled to a respective word drive line and to a respective inhibit drive line, and (d) digit drive lines each coupled to all of the storage elements of a group of storage elements, the arrangement being such that a digit can be written into selected storage elements of a group during the write cycle by the application of coincident current pulses to those word and digit drive lines that are coupled to the selected storage elements and by energizing all of the inhibit drive lines except for the ones which are coupled to the selected storage elements, and (e) sensing means coupled to each digit drive line which is constructed to sense, during a read cycle, a sense signal which is produced in response to the read displacement and the inhibit displacement, if any, of the remanent magnetism of selected storage elements of the associated group of storage elements, and (f) integrating means coupled to each sensing means that is constructed to integrate the sense signal, the arrangement being such that the integrated sense signal represents the initial memory states of selected storage elements of the group whenever their respective inhibit means are not activated during the read cycle, and such that the integrated sense signal acquires a substantially zero value whenever all of the respective inhibit means associated with the group of storage elements are activated during a read cycle.

5. A magnetic memory system as in claim 4 wherein, during a read cycle, the read displacement of the remanent magnetism of any magnetic storage element occurs subsequent to any inhibit displacement of the remanent magnetism of the magnetic storage element, the read displacement being in the opposite sense with respect to, and being substantially equal to twice the magnitude of, any corresponding inhibit displacement.

6. A magnetic memory system as in claim 5 wherein each magnetic storage element is an anisotropic magnetic thin film element having an easy axis of magnetization, the remanent magnetism of each storage element being set parallel to its respective easy axis when the storage element is in either of its stable states, and the read and inhibit displacements of the remanent magnetism of the magnetic storage elements are rotational displacements.

References Cited

UNITED STATES PATENTS

| | | | |
|---|---|---|---|
| 2,819,456 | 1/1958 | Stuart-Williams ------ | 340—174 |
| 3,121,172 | 2/1964 | Mintzer ---------- | 340—174 X |
| 3,328,779 | 6/1967 | Van Der Steeg et al. -- | 340—174 |

STANLEY M. URYNOWICZ, Jr., Primary Examiner